(12) United States Patent
Vangen et al.

(10) Patent No.: US 11,087,072 B2
(45) Date of Patent: Aug. 10, 2021

(54) INTERNET BROWSING

(71) Applicant: PARROTPLAY AS, Trondheim (NO)

(72) Inventors: Stig Runar Vangen, Trondheim (NO);
Jone Brattland, Trondheim (NO);
Borgar Ljosland, Trondheim (NO)

(73) Assignee: PARROTPLAY AS, Trondheim (NO)

( * ) Notice: Subject to any disclaimer, the term of this patent is extended or adjusted under 35 U.S.C. 154(b) by 0 days.

(21) Appl. No.: 16/344,524

(22) PCT Filed: Oct. 25, 2017

(86) PCT No.: PCT/EP2017/077359
§ 371 (c)(1),
(2) Date: Apr. 24, 2019

(87) PCT Pub. No.: WO2018/077978
PCT Pub. Date: May 3, 2018

(65) Prior Publication Data
US 2019/0243883 A1 Aug. 8, 2019

(30) Foreign Application Priority Data
Oct. 25, 2016 (GB) .................... 1618025

(51) Int. Cl.
G06F 17/00 (2019.01)
G06F 40/14 (2020.01)
G06F 16/958 (2019.01)
G06F 16/957 (2019.01)
G06F 16/9535 (2019.01)
H04L 29/08 (2006.01)

(52) U.S. Cl.
CPC ............ *G06F 40/14* (2020.01); *G06F 16/958* (2019.01); *G06F 16/9535* (2019.01); *G06F 16/9577* (2019.01); *H04L 67/02* (2013.01)

(58) Field of Classification Search
CPC .... G06F 40/14; G06F 16/958; G06F 16/9577; G06F 16/9535; G06F 16/95; G06F 16/00; H04L 67/02
USPC ....................................................... 715/234
See application file for complete search history.

(56) References Cited

U.S. PATENT DOCUMENTS 8,850,308 B1 * 9/2014 Roselander ...... G06Q 10/06398
715/239
10,331,769 B1 * 6/2019 Hill ...................... G06F 16/334
(Continued)

OTHER PUBLICATIONS

GB Office Action dated Apr. 3, 2017, GB Patent Application No. GB1618025.9.
(Continued)

*Primary Examiner* — Hassan Mrabi
(74) *Attorney, Agent, or Firm* — Vierra Magen Marcus LLP

(57) ABSTRACT

An apparatus for browsing the Internet includes a browser module (42) configured to retrieve web pages from the Internet, an analysis module (60) operable to analyse a retrieved web page to identify elements of interest in the web page, and an interaction module (63) operable to perform one or more operations in response to and based on the identification of an element or elements of interest in a web page. This can be used, for example, to access and interact with web pages on behalf of a user, and without the need for direct user interaction with the web page or pages.

15 Claims, 9 Drawing Sheets

(56) References Cited

U.S. PATENT DOCUMENTS

| | | | |
|---|---|---|---|
| 2010/0280860 A1* | 11/2010 | Iskold | G06Q 50/01 705/319 |
| 2011/0010612 A1* | 1/2011 | Thorpe | G06F 16/957 715/234 |
| 2011/0185273 A1* | 7/2011 | DaCosta | G06Q 99/00 715/234 |
| 2011/0191676 A1 | 8/2011 | Guttman | |
| 2012/0239598 A1* | 9/2012 | Cascaval | G06F 40/14 706/12 |
| 2012/0323881 A1 | 12/2012 | Liu | |
| 2013/0014002 A1* | 1/2013 | Cai | G06F 16/80 715/234 |
| 2013/0132823 A1* | 5/2013 | Sutic | G06F 40/117 715/234 |
| 2014/0006282 A1* | 1/2014 | Friedman | G06Q 20/12 705/44 |
| 2014/0053053 A1* | 2/2014 | Hogue | G06F 40/14 715/234 |
| 2014/0281918 A1* | 9/2014 | Wei | H04L 67/02 715/234 |
| 2016/0162503 A1* | 6/2016 | Yao | G06Q 30/0275 707/723 |
| 2016/0162779 A1* | 6/2016 | Marcus | G06N 20/00 706/12 |
| 2016/0259773 A1 | 9/2016 | Jadhav | |

OTHER PUBLICATIONS

PCT International Search Report dated Jan. 19, 2018, PCT Patent Application No. PCT/EP2017/077359.

PCT Written Opinion of the International Searching Authority dated Jan. 19, 2018, PCT Patent Application No. PCT/EP2017/077359.

* cited by examiner

INTERNET BROWSING

BACKGROUND

The technology described herein relates to Internet browsing.

A web browser is a software application for retrieving, presenting and traversing information resources on the Internet (the World Wide Web).

It is common nowadays for Internet users to wish to access lots of different services on the Internet, such as entertainment (e.g. movie streaming) services such as Netflix, social media services such as Facebook, e-commerce sites such as Amazon, search services such as Google, etc. While a user is able to access such services via their browser individually (e.g. by logging into each respective service), it is not generally possible for a user to be able to log into plural such services in an effectively simultaneous manner, nor to aggregate their information (e.g. preferences or history) across plural such services automatically.

There are some Internet services that offer some integration and access to plural different other Internet services for a user in a more simultaneous manner. However, such services generally require API (Application Program Interface) integration with the other Internet services that they are accessing, which may be difficult or inconvenient to achieve, and/or many Internet services will not allow (full) access to their services from other Internet services (e.g. Netflix).

Another method is to link and embed directly to other web-page resources by the use of crawling and indexing of other Internet service's web-pages, but this may also be difficult or inconvenient to achieve (for example, a user cannot use a search engine like Google to locate content the user would have access to via Facebook, as Facebook does not allow Google to index content on their web servers). In some cases third party Internet services can also prevent the embedding of their web-resources into third party web-sites, and most modern browsers enforce this prevention.

Thus existing Internet "aggregation" services will not normally be able to access all the information that a user themselves would have access to if logging into the individual web pages directly.

The Applicants believe therefore that there remains scope for improved provision of Internet services to users.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

Figure 1:
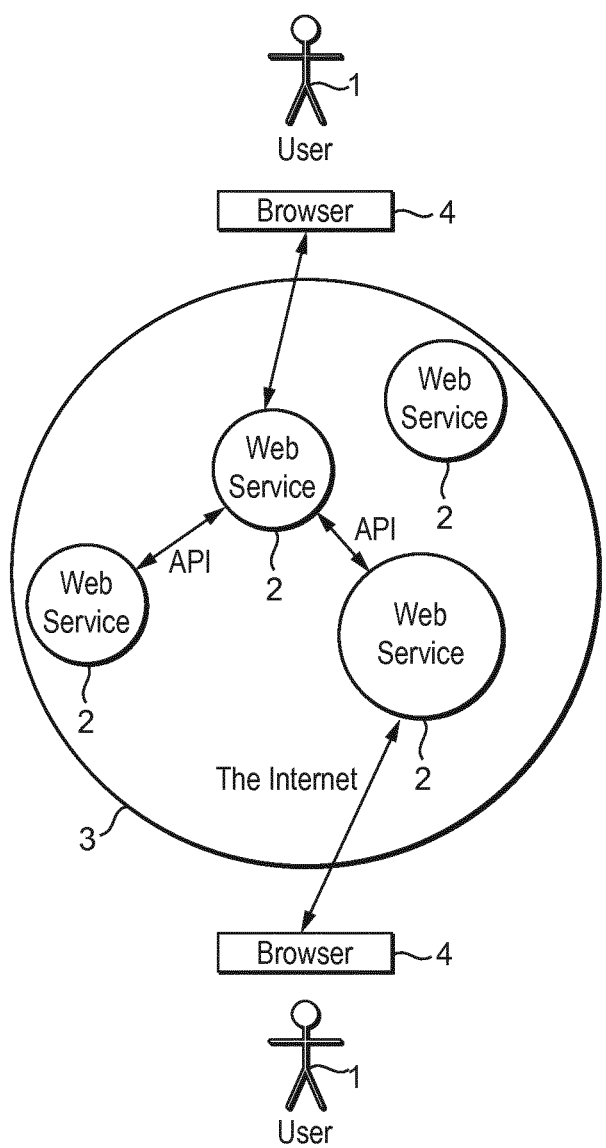
FIG. 1 shows schematically the interaction of users with web services provided via the Internet.

A first embodiment of the technology described herein comprises a method of interacting with a web page on the internet, the method comprising:

analysing by analysis processing circuitry a web page to identify an element or elements of interest in the web page; and performing by interaction processing circuitry one or more operations in response to and based on the identification of an element or elements of interest in the web page.

A second embodiment of the technology described herein comprises an apparatus for interacting with a web page on the Internet, the apparatus comprising:

an analysis module operable to analyse a web page to identify elements of interest in the web page; and an interaction module operable to perform one or more operations in response to and based on the identification of an element or elements of interest in a web page.

The technology described herein relates to the accessing of, and interactions with, web pages, e.g., and in an embodiment, that have been retrieved by a web browser. In the technology described herein, elements of interest in a web page are identified, and then some operation, such as interacting with those elements to trigger operations via the web page, is performed, in response to, and based on, the identified elements of interest. As will be discussed further below, this can allow a web browser to directly and automatically interact with a web page as if it were the user (and on behalf of the user), and without the need for user intervention (e.g. without the need for a user themselves to activate (e.g. click) an interactive element in a web page).

As will be discussed further below, this can then facilitate allowing the user to use and interact with plural services via the Internet in a more simultaneous and seamless manner from the user's perspective, and without, e.g., the need to navigate to and, e.g., log into, different services individually, or to provide a further service (web server) accessible via the Internet to access the different services. It can also facilitate the provision of a uniform user interface to the user for plural different Internet services, thereby providing a more satisfactory and straightforward user experience when a user wishes to access plural different services via the Internet.

As will be discussed further below, the technology described herein can also (more) automatically adapt to changes to a given Internet service and web pages, as it is able to analyse and identify elements within received web pages and to remember and track those changes and to adapt to those changes to maintain intended functionality.

The web page that is analysed in the technology described herein may be any web page. There could be only a single web page that is being analysed, or plural web pages could be analysed in parallel.

The web page (or pages) that is analysed should be, and is in an embodiment, a web page (or pages) that has been retrieved from the Internet. Thus, in an embodiment, the method of the technology described herein further comprises first retrieving a web page or pages, which retrieved web page or pages are then analysed to identify an element or elements of interest, etc. Correspondingly, the apparatus of the technology described herein in an embodiment further comprises a browser module configured to retrieve web pages from the Internet, and the analysis module, etc., then analyses web pages retrieved by the browser module to identify an element or elements of interest, etc.

In an embodiment, the web page or pages is retrieved by a web browser.

The web page or pages that are analysed may be retrieved in response to any suitable and desired event that triggers the retrieving of the web page(s). Thus this may, for example, and in an embodiment does, comprise a direct user input, such as an input in a search field, a click on an interaction object in a web page (e.g. via a web browser), starting a web browser, selecting a web page, and/or a set of web services, etc., that the user wishes to access, etc.

In an embodiment, the web page or pages can be (and in an embodiment are) retrieved automatically, e.g. by the web browser, for example, and in an embodiment, based on some form of prediction of the user's intent. Such prediction may be based, e.g., on factors such as previous user behaviour, the current user context, and/or information relating to actions of similar users in a similar context (setting).

It would also be possible to use a combination of both direct user input and automatic predictive input for determining a web page or pages to retrieve, for example where a particular user input is then used as an input to a predictive process to try to identify a suitable web page or pages to retrieve. For example, a user could enter a query or search term that is then used to predict one or more web pages that the user may be interested in.

Where some form of predictive input is being used, then that could, and is in an embodiment, arranged as an adaptive process, such that it can learn and adapt as it gains experience of a user's activities.

The user input and/or predictive input is in an embodiment used to identify an appropriate web page or pages to retrieve for analysis in the manner of the technology described herein. This may be based, e.g., on one or more predefined rules or criteria that map relevant inputs to particular categories and/or sources, etc., of web pages. For example, there could be an association between particular inputs and one or more content types, content items and/or expected intents for those inputs that are then used to try to determine an appropriate web page or pages to retrieve for analysis. Such "input to web page" translation (mapping) could be fixed, and/or variable and configurable in use, e.g. based on learning a user's activities, as desired.

Thus in an embodiment, the method of the technology described herein comprises (and the apparatus correspondingly comprises an input analysis module operable to) receiving an input indicative of content accessible via the Internet that a user may wish to access, identifying one or more web pages for retrieval based on the input or inputs, and retrieving the identified web page or pages (with the analysis module then analysing those web pages and the interaction module then interacting with those web pages, as discussed above). As discussed above, the input that is used in this regard could be a user input, and/or some form of automatically generated (predicted) input.

This process may also be operable to identify whether there are plural sources for web pages corresponding to the input or inputs that are being used to retrieve the web pages, and to accordingly retrieve and analyse web pages for one or more, and in an embodiment for each, of the identified potential sources. In this case, in an embodiment a web page from the source that is determined as best matching the input or inputs is retrieved.

The element or elements of interest that are identified in a web page can be any suitable and desired elements of a web page that can be identified as distinct elements of a web page. They are in an embodiment information elements of the web page. Thus, the elements in a web page that can be, and that in an embodiment are, identified (identifiable) in the technology described herein in an embodiment comprise one or more of, and in an embodiment all of: hyperlinks; (e.g. bit maps of) user interface icons such as play, pause, forward, rewind symbols, buttons, menu items, friends list, etc.; (e.g. bit maps of) text (words); data entry fields; areas or regions of a web page; HTML elements; CSS elements; images; videos; Adobe Flash, Microsoft Silverlight or other plug-ins; DOM trees; render trees; XML; and JSON. They in an embodiment comprise visual elements of a web page (elements that are seen when the web page is displayed to a user).

In an embodiment, a web page is analysed to identify an interactive element or elements in the web page that can be activated to perform operations via the web page. The analysis may be operable to only identify interactive elements in a web page, or elements of interest that include at least some interactive elements. Where a retrieved web page is analysed to identify interactive elements, then in an embodiment it is analysed to identify interactive elements that can be activated by a user to perform operations via the web page.

In an embodiment, some or all of the elements of interest that a web page is analysed for comprise elements in a web page that may not in themselves be directly actionable, but are elements in a web page that can be identified and then presented in a user interface to a user.

In an embodiment, some or all of the elements of interest that the web page is analysed for comprise information elements in a web page that contain and/or relate to information (e.g. content), e.g., and in an embodiment, that can be extracted from the web page and then presented in a user interface to a user. Such information elements could comprise, e.g., images, text, links, data, etc.

In an embodiment, there are one or more particular, in an embodiment selected, in an embodiment predefined, elements of interest and/or categories of elements of interest that the analysis (analysis module) is operable to identify.

In an embodiment, there is a particular, in an embodiment selected, in an embodiment predefined, set or sets of elements of interest that a web page is analysed for. In an embodiment, there are different sets of elements of interest that a web page is analysed for, for example, and in an embodiment, depending upon the nature of the web page and/or the stage of any interaction with a web page that has been reached.

For example, when a web page is first loaded, it may be analysed to attempt to identify a first set of elements of interest, but once there has been an interaction with the web page, it may then be analysed to identify a second, different set of elements of interest, and so on.

Each particular set of elements of interest may be defined, e.g., and in an embodiment, as comprising one or more elements of interest that should be present in a web page, and/or one or more elements of interest that should be absent (that should not be present) in the web page (for that particular set of elements to be matched by the web page).

In an embodiment, there are one or more sets of elements of interest that contain only a single element of interest (this may be appropriate e.g. if it is desired to identify an element such as a play or pause icon, or a log-in prompt, that on its own can be indicative of an interaction that is required with a web page). Correspondingly, in an embodiment there are sets of elements of interest that contain plural elements of interest. This may be appropriate where a more detailed analysis of a web page is desirable, e.g. to identify a particular form of media player in a web page, and/or to allow a more sophisticated mapping of a web page to a (bespoke) user interface.

Thus, in an embodiment, there are plural sets of particular, in an embodiment selected, in an embodiment predetermined, elements of interest that a web page may be analysed for, and a given web page is analysed to see if it matches a particular, in an embodiment selected, in an embodiment predefined, one or more of those sets in accordance with one or more particular, in an embodiment selected, in an embodiment predefined, criteria, such as, and in an embodiment indications of the current context of the user's Internet browsing, such as the identity of the user, their recent or current web activity, the current state of the web page in question, environmental factors such as the user's location and the time of day, etc.

The elements of interest in a web page can be identified in any suitable and desired manner. The analysis should be and is in an embodiment operable to analyse and identify elements of interest in a web page as it would be accessed (seen) by a user accessing the web page. Thus the analysis will be and is in an embodiment operable to analyse and identify elements of interest from web page browser data represented in the form that is intended for presenting the web page to the user.

In an embodiment this is done, at least in part, from a visual analysis of the web page, e.g., and in an embodiment, from a visual analysis of the bitmap representation of the rendered web page, e.g. and in an embodiment, from a visual analysis of the frame buffer (bitmap) for the web page. This can be done using appropriate computer vision techniques, such as pattern matching, optical character recognition, etc.

Such visual analysis can be performed as desired, e.g. by scanning the bitmap to be displayed for the web page, to identify, e.g., and in an embodiment, visual elements, such as text (words), symbols, icons, etc., that represent elements within the web page, e.g., and in an embodiment, to identify whether a web page contains any particular, e.g. predefined, and in an embodiment selected, visual elements (e.g. icons or text) that could correspond to desired elements of interest within the web page.

In an embodiment, the analysis to identify elements of interest within a web page also or instead, and in an embodiment also, considers and analyses the software code (such as, and in an embodiment, source code, JavaScript, CSS, txt, etc.) that is associated with the web page (e.g. that defines elements within the web page) (that is provided for the web page). This may again be done in any suitable and desired manner for example using appropriate computational analysis and extraction techniques, and may be used to identify elements of the web page code that correspond to elements of interest within the web page.

In an embodiment, the software code for a web page is analysed to identify the presence and/or state of particular JavaScript functions and/or objects. This may be done, e.g., and in an embodiment, by injecting appropriate JavaScript into the web pages to test for the presence and/or state of particular JavaScript functions and/or objects.

In an embodiment, the analysis to identify elements of interest within a web page also or instead, and in an embodiment also, considers and analyses derived information (data) that is derived (generated) for the web page (e.g. to define elements within the web page), such as the document object model, the render object tree, etc. This may again be done in any suitable and desired manner.

In an embodiment, the Document Object Model (DOM) for the web page is analysed to identify the present (and/or absence) of particular DOM items for the web page.

In an embodiment, two or more of these techniques, e.g. visual analysis and software code analysis, are used in combination to (try to) identify elements of interest in a web page. In this case, it would be possible, e.g., to take information extracted using each of these techniques and use that information in combination to try to identify elements of interest in a web page, and/or, one of the techniques could be used first to identify elements of interest, and then any elements of interest identified using that first technique, then further, e.g., tested and/or analysed, using one or more other techniques (and so on, as desired).

For example, code for the web page may, and is in an embodiment, analysed first to identify potential elements of interest within a web page, and then a visual analysis of the identified element(s) performed to confirm or not that the element is an element of interest within the web page and, e.g., the function of that element (and/or vice-versa, e.g. a visual analysis followed by code analysis).

Thus, in an embodiment, the analysis of a web page to identify elements of interest within the web page is performed in an iterative manner, for example, and in an embodiment, by first identifying a potential, e.g. interactive, element of interest within the web page, and then performing some form of testing on that, e.g. interactive, element to determine if it is an, e.g. interactive, element of interest (and in an embodiment the expected, e.g. interactive, element), and so on (if necessary), so as to confirm that an identified element in a retrieved web page is in fact an (e.g. interactive) element of interest and the function of that (e.g. interactive) element.

In an embodiment, a record of previously identified elements of interest in a web page or web pages is kept, and then used to assist when identifying elements of interest in a retrieved web page.

In an embodiment, the analysis of a web page to identify elements of interest in the web page and the analysis module is implemented as a trained neural network or other suitable machine learning system. In an embodiment a set of predetermined elements of interest are used to train the network, and the network can in an embodiment be further trained in use, e.g. by user supervised learning.

Once the elements of interest in a retrieved web page have been identified, then an operation or operations in response to and based on the identification of the elements of interest is performed. The operation that is performed in response to the identification of elements of interest in a web page can be any suitable and desired operation, and may, e.g., and in an embodiment does, depend upon the nature of the element(s) of interest that has been identified.

In an embodiment, the operation that is performed is an operation that can be performed via the web page (and the operation is in an embodiment performed via the web page).

In an embodiment, the operation or operations comprise interacting with the web page, e.g., and in an embodiment, to perform some action via the web page. This will then allow the apparatus of the technology described herein to interact with a web page on behalf of (and as if it were) the user.

Thus, in an embodiment, the method of the technology described herein comprises the interaction processing circuitry (and the interaction module is operable to) interacting with the web page in response to and based on the identification of an element or elements of interest in the web page.

Where the operation(s) that is performed comprises interacting with the web page, that is in an embodiment done by interacting with an identified element of interest in the web page (e.g., and in an embodiment by activating an identified interactive element in the web page).

Thus, in an embodiment, particularly where an interactive element in the web page that can be activated to perform operations via the web page has been identified, the operation that is performed in response to the identification of the element(s) of interest is the activation of an identified (interactive) element in the web page to perform an operation or operations via the web page. Thus, in an embodiment, the operation or operations that are performed comprises (and the interaction module is operable to (and operates to)) activating an identified interactive element in a web page to perform an operation or operations via the web page.

Where the operation(s) that is performed in response to and based on the identified element(s) of interest in a web page comprises interacting with the web page, then that interaction can be achieved in any suitable and desired manner. Such interaction will be the interaction processing circuitry (interaction module) interacting with the web page itself, i.e. this interaction is via the processing circuitry (e.g. the interaction module) interacting with the web page (e.g. activating an identified interactive element in the web page itself), not due to a user activating (e.g. clicking) the interactive element.

In one embodiment, such interaction can be, and is in an embodiment, done automatically, and without the need for (nor in response to) any intervention by the user. This could then allow the apparatus to interact with a web page (via its interactive elements) on behalf of the user, but without the need, e.g., for positive action by the user in this regard. This could be used, for example, by the apparatus to log the user into the web service (e.g. account) that a web page represents and corresponds to automatically, without the need for user input.

Correspondingly, in an embodiment, the apparatus, etc., has access to and/or is able to store and use, user related information, such as account and log-in details, relating to a web page and/or service, such that the apparatus, etc., can interact with the web page and/or service as if it were the user, but independently of the user. In an embodiment such account and/or log-in settings and actions are configurable by a user.

In an embodiment, the interaction with (an identified element in) a web page can be (and is) triggered in response to a user input. In this case the interaction with the (e.g. identified interactive element in the) web page will be in response to a user interaction that is not in itself an interaction with the element in question (e.g. activation of the identified interactive element), but is some other form of user interaction that then triggers the interaction module (circuitry) to interact with the web page in a given manner (e.g. with the identified interactive element).

In an embodiment the, e.g. web browser, can interact with an identified interactive element in a received web page both automatically (without user intervention), and in response to a user input.

The interaction module and processing circuitry can interact with a web page in any suitable and desired manner. In one embodiment, this is done using appropriate JavaScript injection to interact with the web page (e.g. to activate an identified interactive element in the web page). In another embodiment, the interaction module and processing circuitry is conferred also or instead (and in an embodiment also) to use user input emulation (e.g. by emulating mouse movements and clicks, and/or keyboard (e.g. text) inputs) to activate elements in a web page.

In an embodiment, the interaction with a web page in response to and based on the identified elements of interest in a web page is performed as an iterative process, e.g., and in an embodiment, such that a first interaction with the web page is attempted, and if that first interaction with the web page fails, a second, different interaction with the web page is attempted, and so on, until either an interaction having the desired outcome is performed, or a given, particular, e.g. in an embodiment selected, in an embodiment predefined, number of interactions have been attempted and not succeeded.

In an embodiment, where an interaction or interactions with a web page in the manner of the technology described herein are not successful (do not achieve the desired outcome), then the operation reverts to requiring a direct user interaction with the web page in order to achieve the desired interaction with the web page. In that case, a user could, e.g., be appropriately prompted to interact with the web page directly for this purpose.

In an embodiment, one or more, and in an embodiment all, of the following operations can be (and in an embodiment are) performed in response to identified elements of interest in a web page:

the activation of functions via (and in) the web page, such as menu items, buttons, downloads, chat functions, play buttons and any other "clickable" elements that a user can "click at";

the reading (retrieval) of information from and via the web page, such as messages, friends' updates on social networks, recommendations given by streaming services, user histories and/or preferences, and/or advertisements presented to the user (this is in an embodiment done in order to process this information and present it to the user in a new and aggregated form); and the navigation of web pages and websites (e.g. in order to perform one or both of the above operations).

In one embodiment, the operation that is performed is to extract information (information elements) from and/or via a web page and present it or them to a user in a user interface. In an embodiment, information (information elements) are extracted from plural web pages and then presented in combination in a user interface to a user.

In one embodiment, the operation that is performed is to interact with a web page via the identified (e.g. interactive) elements of interest so as to retrieve stored user data of the web service in question, such as stored preferences, history, etc. relating to the web service for the user.

In an embodiment, information, such as a user's history and/or preferences for a web service are accessed via the identified (e.g. interactive) elements of web pages for plural web services (via plural web pages), and then collated and/or aggregated so as to then be able to present aggregated information, such as an aggregated history and/or preferences, to the user, and/or so as to use that aggregated information, e.g. history and/or preferences information, for the user to control further interactions with a web page or pages and/or service or services on behalf of the user. For example, the web history and preferences for a user for plural entertainment services, such as Netflix, HBO, etc., could be accessed and analysed, and then used to present an aggregated entertainment offering to the user based on that analysis.

This can then be used to provide an improved user experience, for example by avoiding the need for the user to log into each and access each individual web service individually to determine what entertainment options may be available for the user from each of those web services.

In an embodiment, the analysis to identify an element or elements of interest in a web page is used to determine a current state of the web page (to classify the web page as being in a particular state), such as, but not limited to, states such as: document loaded, sign-in needed, player ready, video playing or video paused. In an embodiment there is a set of, in an embodiment plural, particular, in an embodiment selected, in an embodiment predefined, states that can be identified and that a web page can be classified as being in.

In an embodiment, the operation or operations that is then performed in response to and based on the identification of an element or elements of interest in a web page in an embodiment then comprises one or more operations that are intended to change the state of the web page from its determined current state to a particular, in an embodiment selected, in an embodiment predefined, "desired" state. In this case therefore, in an embodiment, the operation or operations that are performed in response to and based on the identification of the element or elements of interest in a web page comprise interacting with the web page in order to change the state of the web page to a different, desired state. This could be, for example, to change the state of a web page from a video being paused to a video playing (or vice-versa), and/or from a state of a sign-in being needed to the user being signed into the web page, etc.

Thus, in an embodiment, the technology described herein comprises (and the apparatus is appropriately configured to) analysing a web page to identify an element or elements of interest in the web page to classify the web page as being in a particular state, and then performing one or more operations in response to and based on the determined state of the web page so as to move the web page into a different state (and in an embodiment interacting with one or more identified elements of interest in the web page to do that).

In an embodiment, once an operation or operations to interact with a web page to change the state of the web page have been performed, then the web page is again analysed to identify an element or elements of interest in the web page in order to determine whether the web page has moved to the intended (desired) state following the interaction with the web page or not. In an embodiment, if it is not determined that the web page has moved to the desired state, then the web page is in an embodiment reverted to its previous state and (if available) an alternative interaction to try to move the web page to the desired state is performed. This is in an embodiment continued until the web page has reached the desired state, or all possible interactions to try to move the web page to the desired state have been attempted and failed.

The process is in an embodiment then repeated for the new state of the web page when it is desired to change the web page from that state into a new state, and so on.

In an embodiment, a web page is interacted with through one or more state changes until a desired, final, end (goal) state for the web page is achieved. In the case of a media player, for example, this could be to have a video playing in full screen on the web page.

In an embodiment, once a web page has been interacted with to reach a desired, e.g. end, state, the web page is then displayed to the user. The web page could be displayed in its existing form to the user, but in an embodiment, the web page (or at least the relevant content of the web page) is mapped to an alternative user interface that is then displayed for the user so as to present the user with the (desired) content of the web page.

In an embodiment, the system is operable to retrieve and interact with plural web pages, and then to display the plural web pages in combination in a user interface to the user.

In an embodiment, there are one or more particular, in an embodiment selected, in an embodiment predefined, user interface layouts that a web page or pages can be mapped to for display to the user. The layout to use may be selected, e.g., in dependence upon the number of web pages that are to be displayed, the current context of the user's actions, etc., as desired.

Thus, in an embodiment of the technology described herein, the method of the technology described herein further comprises (and the apparatus includes a composition module operable to) transforming the content of an analysed and interacted with a web page to a user interface format for displaying content of the web page (and, e.g., and in an embodiment, the entire web page) to a user in a user interface (and then displaying the so-transformed web page on a display).

A web page can be transformed for display in this manner in any suitable and desired manner, such as by injecting CSS into the web page to transform the layout of the content in the web page, by extracting an image from the bitmap of the web page, and/or by exporting data from the source web page and using that to populate the new display layout with the data. Any one or more or all of these techniques could be used.

In an embodiment, the web page transformation process is operable to map any identified interaction (e.g. interactive) elements in the web page to corresponding interaction (e.g. interactive) elements that will be displayed in the user interface layout for the web page that is displayed to the user. This should be, and is in an embodiment, done such that a user interaction with an interaction element in the displayed user interface layout for the web page, will trigger and cause the, e.g. interaction module, to interact with the corresponding "mapped" interaction element in the retrieved web page so as to trigger the corresponding interaction in the web page. This may be done as desired, e.g. by injecting JavaScript into the web page that can communicate with the user interface display layout for the web page element and run code snippets to perform interactions with the web page in response to interactions with the user interface display for the web page.

Thus, in an embodiment, the method comprises (and the apparatus is operable to) presenting to a user one or more interaction (interactive) elements that the user may then interact with, and in response to the user activating one of those presented interaction elements, then activating an identified interactive element in the web page in question. Thus, in an embodiment, the method comprises (and the apparatus is operable to) mapping identified (e.g. interactive) elements in a web page to one or more (e.g. interactive) elements in a displayed user interface that is presented to a user, and activating interactive element(s) in the web page in response to the activation of the corresponding interactive elements in the user interface display that has been presented to the user.

In an embodiment, this arrangement can be, and is in an embodiment, used to provide a common (uniform) user interface to a user for a plurality of different web services. For example, where a user is able to activate one or more media services that may, e.g., include media (e.g. video) players for those services, this operation of the technology described herein can be used to map each web service's media player to a common media player that is presented to a user that the user can then use to activate the media players of the respective web services. This then facilitates presenting to the user a common user interface across plural different web services, and can therefore provide an enhanced user experience, in comparison to, for example, arrangements where the user has to learn and interact with a different media player for each web service.

Thus, in an embodiment, the method of the technology described herein comprises (and the apparatus is operable to), when presenting an analysed and interacted with web page or pages to a user, presenting the web page or pages to the user in a user interface that includes a set of one or more interactive elements that can be activated by a user via the user interface, and mapping that set of interactive elements that are displayed in the user interface to corresponding interactive elements in the web page or pages, such that activation by a user of an interactive element in the displayed user interface will cause the (automatic) activation of the corresponding interactive element in a or the or all of the web pages.

The set of interactive elements that is displayed in the user interface that is displayed to the user could be any suitable and desired set of interactive elements that may be desirable and useful when interacting with web pages. In one embodiment, the set of interactive elements comprises a set of media player controls.

Other arrangements would, of course, be possible.

In such arrangements, there could, e.g., be a single common user interface that is presented or there could be different common user interfaces that are presented depending upon, e.g., the service that is being provided by the web page or pages that are being retrieved. For example there could be one user interface for entertainment, such as movie services, and a different user interface for other services, such as e-commerce or news services.

It would also be possible for the user interface that is presented to the user to be dynamic, for example to vary the way that the user interface is displayed and/or its content depending on one or more criteria or factors such as filters, such as "latest", "trending", "most popular", etc., and/or whether it can be determined that, e.g., the user's friends are currently online and/or their activities.

Thus, in an embodiment, the technology described herein comprises extracting information (information elements) from multiple web pages (such as images, links, data), and mapping that information (them) to a (different) user interface for presenting (displaying) to the user, and, in an embodiment, correspondingly mapping user interactions from that user interface that is displayed to the user to at least one of the web pages that have been analysed and interacted with. In an embodiment, plural web pages (services) are mapped to a single user interface that is presented (displayed) to the user, but it would also be possible, e.g., to map plural web pages to plural user interfaces for presentation to a user, if desired.

The operation in the manner of the technology described herein, such as identifying elements of interest in a web page (and which elements of interest to try to identify), and subsequent interaction with a web page based on that analysis can be controlled and triggered in any suitable and desired manner. In an embodiment, there is a set or sets of instructions that are to be followed by the apparatus (processor) in question and that control the operation in the manner of the technology described herein. There could, for example, be a single set of instructions, but in an embodiment there are plural sets of particular, in an embodiment selected, in an embodiment predefined, instructions, with each set, e.g., and in an embodiment, corresponding to a particular, in an embodiment selected, in an embodiment predefined, situation or context that may be encountered.

Each set of instructions may contain only a single instruction or plural instructions.

In an embodiment, there are sets of instructions that are associated with and to be used for particular identified web page states, that then control the interaction with a web page that has been identified as being in the corresponding state. In an embodiment some or all of the possible identifiable web page states have plural instruction sets associated with them. In this case, the system in an embodiment operates to try a first associated instruction set when the web page state is identified, and if that instruction set does not produce the desired result, then tries a second associated instruction set for that web page state (and so on, until either the desired result is achieved or all the (relevant) instruction sets have been tried).

In an embodiment, there is also one or more general instruction sets that may be used irrespective of the web page state (as well as web page state specific instruction sets).

In an embodiment, there are instruction sets for more general web page state classifications, and then also instruction sets for more specific web page state classifications (e.g. where it is possible to identify the state of a web page more precisely, such as the specific source (e.g. content provider) for the web page, etc., within a more general web page state classification).

The set or sets of instructions that are to be followed and executed for analysing and interacting with a web page can be stored and provided as desired. They are in an embodiment stored appropriately in memory for retrieval by the analysis and/or interaction module, etc., as appropriate.

In an embodiment, the set or sets of instructions to use and/or the execution (following) of the instructions in a set of instructions is dependent upon one or more particular, in an embodiment selected, in an embodiment predefined, criteria or conditions that are, e.g., and in an embodiment, dependent upon one or more particular, in an embodiment selected, in an embodiment predefined, context factors indicative of the context of the user's current situation and/or activity. This may be based, for example, on parameters such as the user's geographical location, the user's operating system, the user's language preferences, etc.

In an embodiment, the analysis and interaction instruction set or sets can be modified in use, e.g., and in an embodiment, in dependence upon the analysis of and interaction with web pages in use. In an embodiment the results of an analysis of and interaction with a web page is tested to determine if it resulted in the expected and/or desired result, and the corresponding set of instructions is then modified accordingly, and/or the probability of using that set of instructions in the same situation or context again is modified accordingly (e.g. to increase the probability of selecting that set of instructions for execution if the operation was successful and vice-versa).

Thus, in an embodiment, the operation and apparatus is configured to be able to learn and improve its operation in use. This is in an embodiment done using appropriate machine learning techniques.

Thus, in an embodiment, the apparatus of the technology described herein includes a machine learning module that can learn from analysis of and interactions with web pages how to improve its operation, such as how to better identify elements of interest in a web page and/or how to better interact with a web page.

In an embodiment, the system is also operable to analyse a user's interactions with web pages and web services that they access, and to correspondingly adapt and improve its operation based on that analysis.

In an embodiment, plural systems that are operating in the manner of the technology described herein are able to exchange information relating to their analysis of and interaction with web pages, so as to provide a distributed learning system for improving the analysis and interaction of those systems with web pages.

The functionality and apparatus of the technology described herein can be provided in any suitable and desired manner. For example, the additional functionality of being able to analyse, identify and interact with interactive elements in a received web page could be provided via a plug-in for an existing web browser, and/or as an operating system application that interacts with an existing web browser via the operating system, or in the form of a "standalone" web browser that incorporates the functionality of the technology described herein.

In an embodiment, the apparatus and operation of the technology described herein is implemented by executing an appropriate software application(s) on a processor, such as a CPU of a data processing system. In this case, the, e.g., software application, e.g. could execute on a single processor, or the overall operation and, e.g. application, could be executed in a more distributed fashion, for example via a client application or module on a user's local data processing system and a server application or module that performs some or all of the processing operations, etc., that is accessible via the Internet.

Correspondingly, the analysis processing circuitry, interaction processing circuitry, etc. are in an embodiment implemented as appropriate programmable processing circuitry that is appropriately programmed to perform the operation (function) in question.

Correspondingly, the analysis module, interaction module, etc., in an embodiment comprise and are implemented as appropriate software code executing on a processor or processors (on programmable processing circuitry).

In an embodiment the apparatus of the technology described herein comprises a web browser comprising:

a browser module configured to retrieve web pages from the Internet;

an analysis module operable to analyse a retrieved web page to identify elements of interest in the web page; and an interaction module operable to perform one or more operations in response to and based on the identification of an element or elements of interest in a web page.

The functionality and apparatus of the technology described herein could be provided in a standalone form in the data processing system (e.g. in a web browser) that performs all of the operations in the manner of the technology described herein. Alternatively, some or all of the functions of the technology described herein and elements of the apparatus of the technology described herein could be implemented via remote services (e.g. a server or servers) that are accessible, e.g., and in an embodiment, via the Internet, that the data processing system (e.g. web browser) is in communication with and can access when it is required to analyse and interact with a web page.

Other arrangements would, of course, be possible.

Although the technology described herein has been described above with particular reference to, and the operation in respect of, a given web page from a web service, as will be appreciated by those skilled in the art, the technology described herein can be and is in an embodiment used for plural web pages, e.g., and in an embodiment, in the normal manner that a user may choose to interact with web services and web pages via the Internet.

As will be appreciated by those skilled in the art, the technology described herein will typically be, and is in an embodiment, implemented in a data processing system that may and in an embodiment does also comprise one or more of, and in an embodiment all of: a central processing unit, a graphics processing unit, a video processor (codec), an image signal processor (ISP), a system bus, and a memory controller. The technology described herein (and a web browser) may, e.g., and in an embodiment, execute as an application or applications on the central processing unit of the data processing system. It can also be implemented as (part of) an operating system itself.

The data processing system may be, and in an embodiment is, configured to communicate with one or more of (and the technology described herein also extends to an arrangement comprising one or more of): an external memory (e.g. via the memory controller), one or more local displays, and/or one or more external displays. The external memory in an embodiment comprises a main memory (e.g. that is used by the central processing unit (CPU)) of the overall data processing system.

Thus, in some embodiments, the apparatus of the technology described herein and/or data processing system comprises, and/or is in communication with, one or more memories and/or memory devices that store the data described herein, and/or store software for performing the processes described herein.

Correspondingly, a further embodiment of the technology described herein comprises a data processing system comprising:

a main memory;

a display;

a central processing unit; and a browser module executing on the central processing unit, operable to retrieve web pages from the Internet;

an analysis module executing on the central processing unit operable to analyse a retrieved web page to identify elements of interest in the web page; and an interaction module executing on the central processing unit operable to perform one or more operations in response to and based on the identification of an element or elements of interest in a web page.

As will be appreciated by those skilled in the art, this embodiment of the technology described herein can and in an embodiment does include one or more, and in an embodiment all, of the features of the technology described herein described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, modules, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages, modules, etc., of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages, modules, and processing stage circuitry of the technology described herein may be provided as a separate circuit element to any one or more of the other processing stages, modules, or processing stage circuitry, and/or any one or more or all of the processing stages, modules, and processing stage circuitry may be at least partially formed of shared processing circuitry.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web, pre-loaded on a Smart-TV or as a pre-configured computer, etc.

A number of embodiments of the technology described herein will now be described.

FIG. 1 shows schematically the interaction of users 1 with web services 2 provided via the Internet 3. As shown in FIG. 1, in this arrangement, each user uses a browser 4 to interact with a desired web service 2 (such as Facebook, Google, Twitter, Nefflix, etc.). Certain web services may also be able to interact directly with other web services via appropriate APIs.

Figure 2:
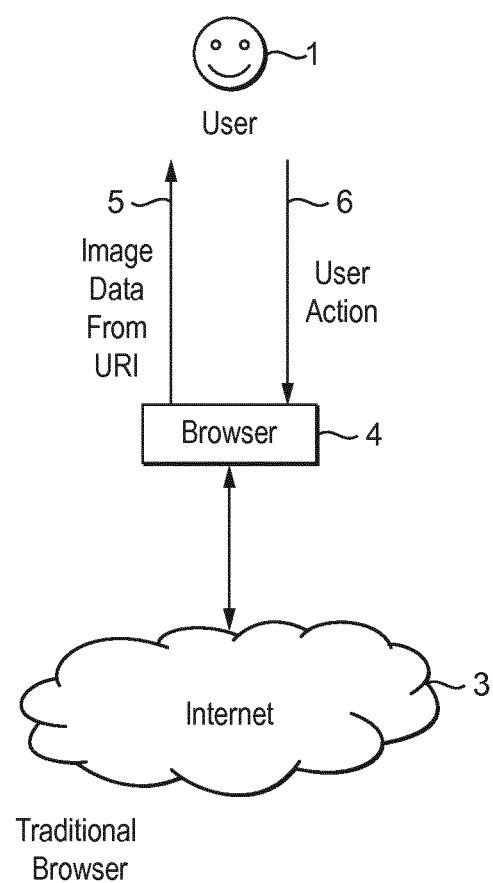
FIG. 2 shows schematically the interaction between a user and the Internet via a browser.

FIG. 2 shows the corresponding interaction arrangement between the user 1 and the Internet 3 via a browser 4. As shown in FIG. 2, the browser 4 will access web services on the Internet and return image data 5 from requested web pages to the user 1 in response to user actions 6.

Figure 3:
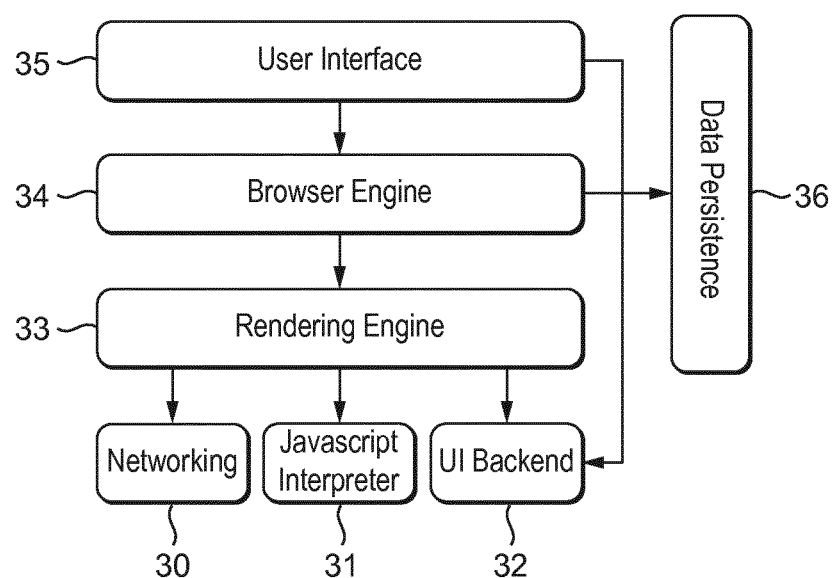
FIG. 3 shows schematically exemplary architecture for a web browser.

FIG. 3 shows corresponding exemplary architecture for a web browser 4. As shown in FIG. 3, the web browser will include a number of different modules that operate together to provide the overall browser operation, including a networking module 30, a Java script interpreter 31, a user interface back-end 32, a rendering engine 33, a browser engine 34 and a user interface 35. The browser 4 may also include some suitable storage 36 to facilitate preservation of relevant data.

Figure 4:
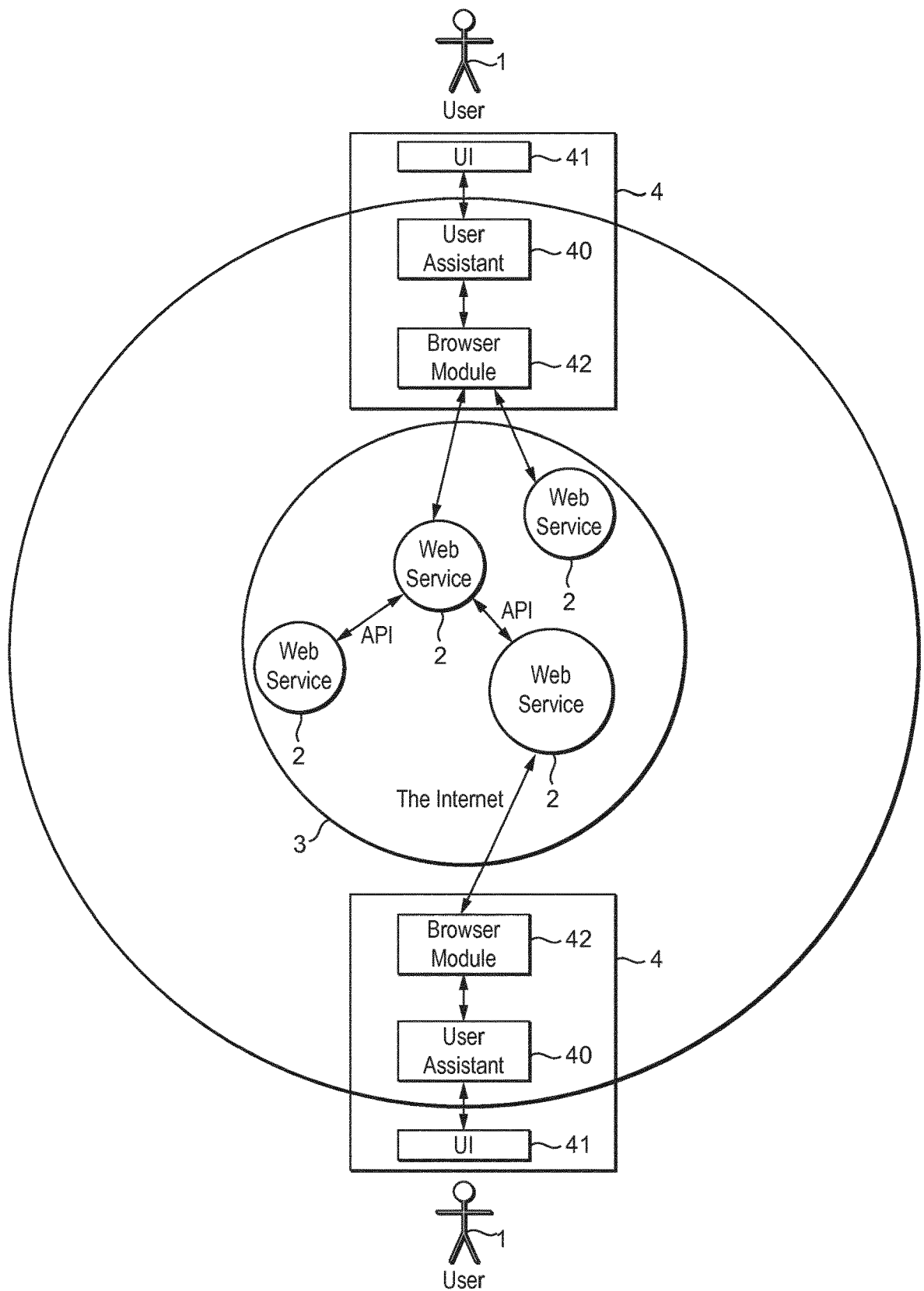
FIG. 4 shows schematically an embodiment of the technology described herein for allowing users to access web services on the Internet.

FIG. 4 shows schematically an embodiment of the technology described herein for allowing users to access web services on the Internet. As shown in FIG. 4, in this embodiment of the technology described herein, the user 1 accesses the web services 2 using a browser 4 that includes a user assistant module 40 that interacts with a browser module 42, and that presents a user interface 41 to the user via which the user may interact with the web services 2.

Figure 5:
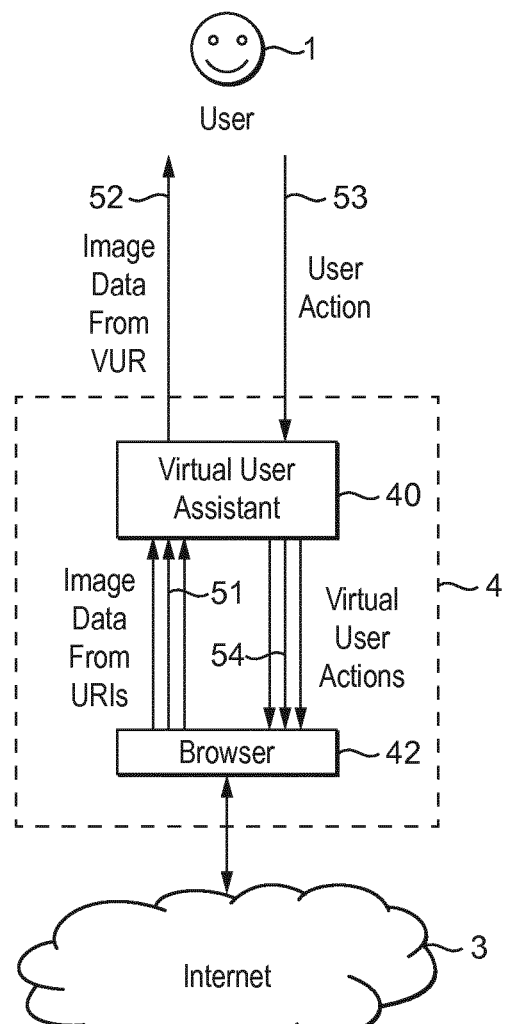
FIG. 5 shows schematically the interaction between the user and the Internet via a browser in the embodiment of FIG. 4.

FIG. 5 illustrates this operation of the embodiment shown in FIG. 4, and correspondingly shows that the user assistant module 40 interfaces between the browser module 42 and the user 1. In particular, the user assistant module 40 receives image data 51 of web pages accessed by the browser module 42 and presents from that image data, image data 52 representing a user interface to the user 1. The user may then interact 53 with the user assistant module 40, and the user assistant module 40 converts those user actions 53 into appropriate interactions 54 with the browser module 42.

The operation of the user assistant module 40 in this regard will be discussed in more detail below.

Figure 6:
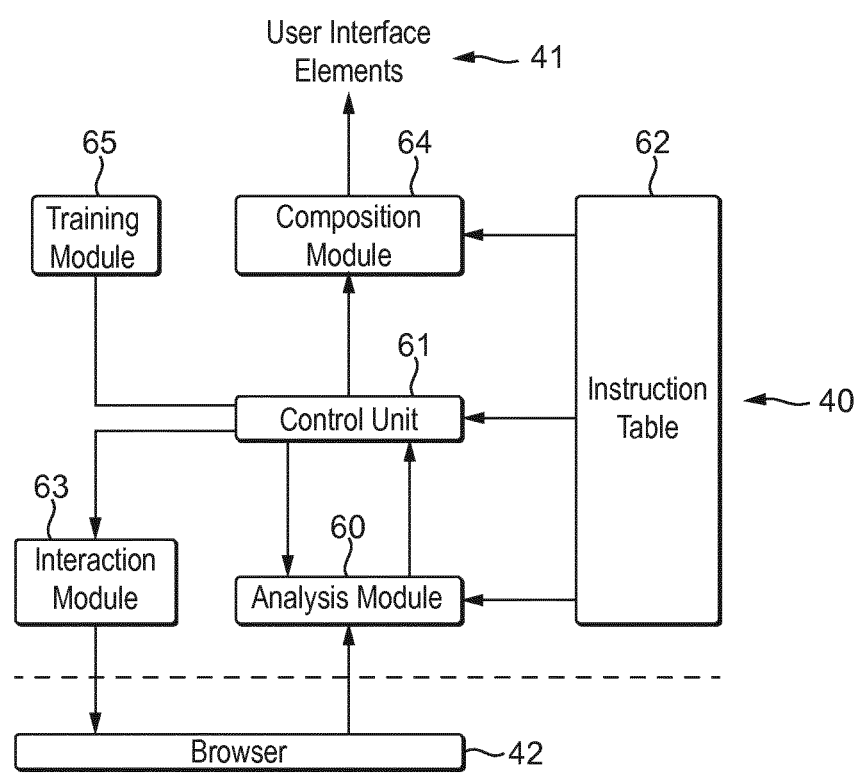
FIG. 6 shows schematically functional units of a web browser in an embodiment of the technology described herein.

FIG. 6 shows schematically the functional units of the user assistant module 40 in an embodiment of the technology described herein.

As shown in FIG. 6 (and in FIG. 5) the user assistant module 40 is operable to interact with a browser module 42. The browser module 42 can be, e.g., an existing browser designed to browse the Internet. The user assistant module 40 can integrate with this browser 42 either through operating system (OS) mechanisms, e.g. where the browser can use masked-keyboard input/output and reference the frame buffer memory of the browser for output. Alternatively, the user assistant module 40 can be more integrated with the browser 42, with the input/output interfaces being more deeply integrated with the user assistant module 40.

As shown in FIG. 6, the user assistant module 40 includes an analysis module 60 that is operable to receive data from the browser module 42 and to analyse received web page data from the browser module 42 to identify elements of interest within a web page received by the browser module 42.

In the present embodiment, the analysis module 60 is operable to identify elements of interest in a web page received from the browser module 42 by analysis of the image data (e.g. the frame buffer) for the web page. For example, the frame bit map can be analysed with computer vision techniques to locate particular words such as "Play", or symbols (icons) such as a "play symbol", in the bitmap.

This may be implemented, e.g., as a trained neural network, where predefined visual elements have been used to train the network. Such visual elements could be, e.g., bit maps of: play, pause, forward, and rewind symbols; text fields; progress bars and indicators; friends list snippets; facebook post snippets; twitter messages; etc.

The visual elements could be defined progressively more precisely, if desired. For example a class of visual elements could be "bitmap.player_symbol.play", with a sub-class to this being: "bitmap.player_symbol.play.netflix". Then, when a user has chosen to play a movie on, e.g. Netflix, the visual analysis would first try to find visual elements that corresponds to the bitmap.player_symbol.play.netflix sub-class, but if that fails, look for visual elements corresponding to the bitmap.player_symbol.play class.

Other visual analysis techniques could also be used, such as Optical Character Recognition to convert bit maps of text to text, edge detection, and bounding box detection, various transformation algorithms, etc.

The analysis module 60 can also analyse data input from the browser's network layer, and generated data such as the document object model, the render object tree etc., for a received web page. The information the analysis module 60 attempts to identify in a received web page is guided by instructions from a control unit 61 and an instruction table 62.

The user assistant module 40 also includes a control unit 61, which takes instructions from an instruction table 62 and information from the analysis module 60, and performs operations in response to that information. It is able to instruct an interaction module 63 to interact with a web page and web service via the browser module 42, e.g. in response to user actions and/or automatically, e.g., and in an embodiment, in order to emulate user actions in order to generate more input to the analysis module 60.

The user assistant module 40 also includes a composition module 64, which is operable to generate a user interface 41 for presenting to the user 1 based on web pages received by the browser module 42 and the analysis of those web pages by the analysis module 60.

The composition module 64 generates an appropriate user interface (user interface data), e.g. that the user is able to interact with to control the user assistant module 40 to then interact with a web page on the user's behalf.

The user assistant module 40 also includes a training module 65.

An embodiment of the operation of the user assistant module 40 will now be described with reference to FIG. 7.

Figure 7:
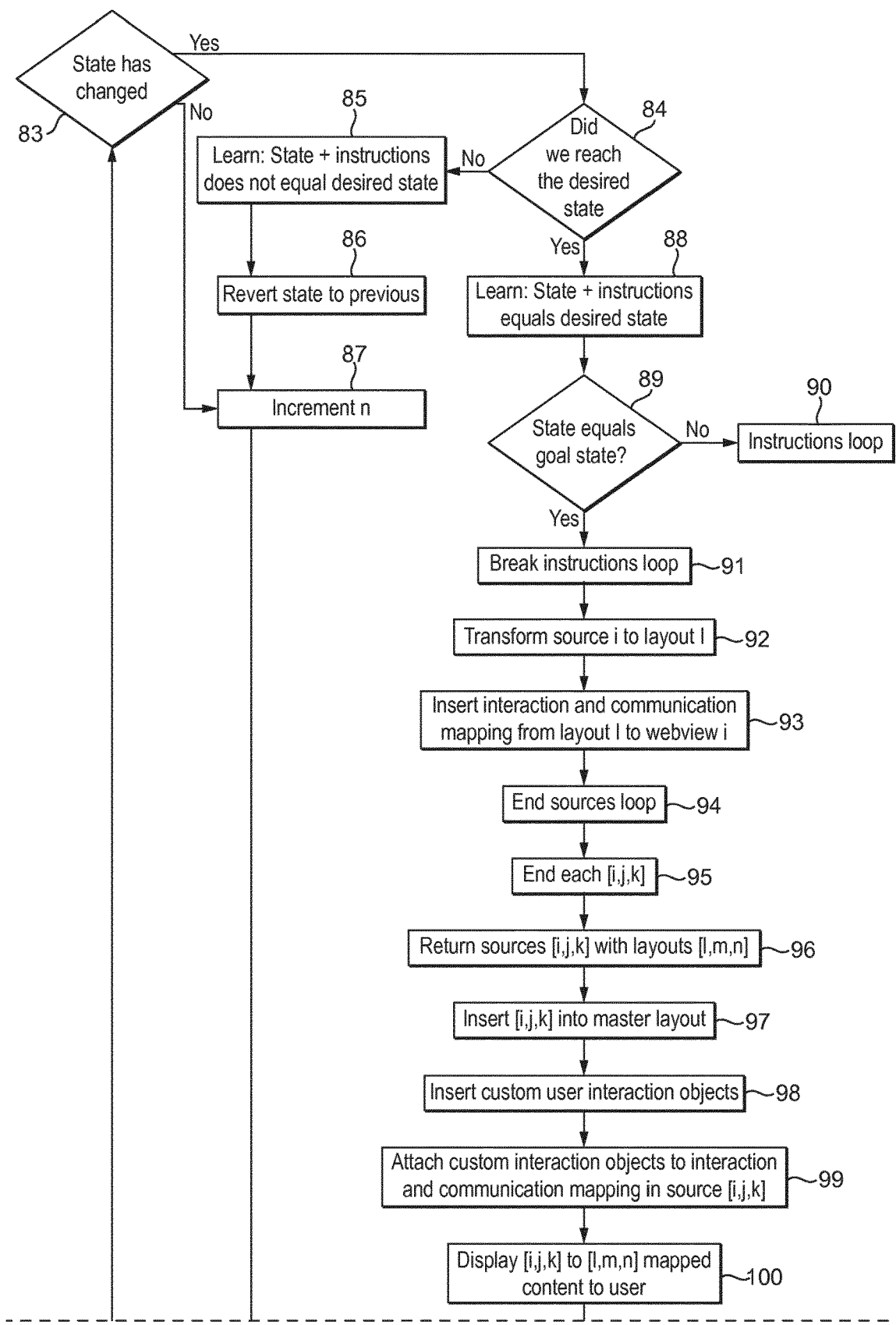
FIG. 7 shows the operation of analysing and interacting with a web page in an embodiment of the technology described herein.
Figure 7:
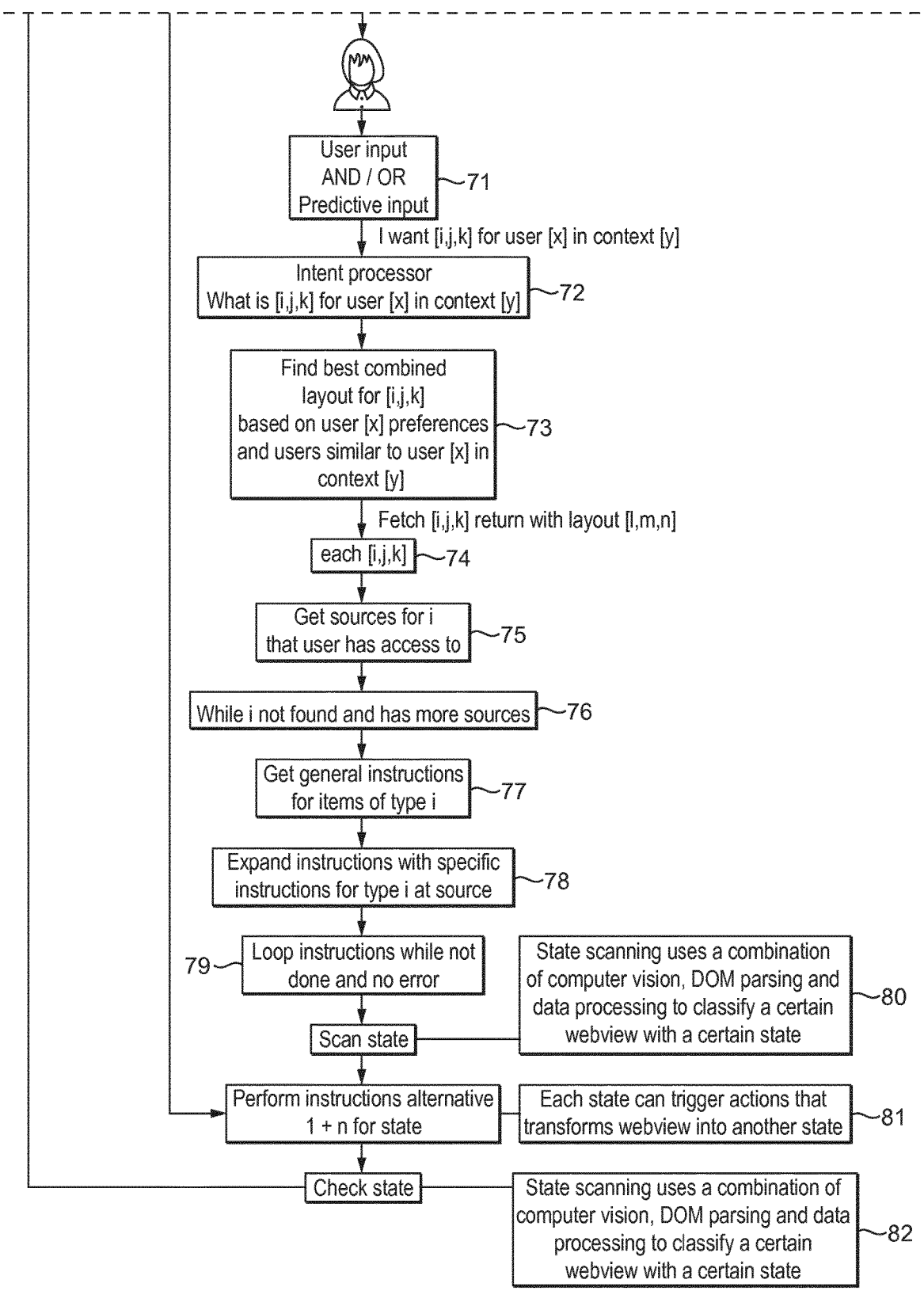

As shown in FIG. 7, the process starts with an input to the user assistant module 40 (step 71).

This input to the system could be either direct user input such as input in a search field or a click on an interaction object. It could also be a predictive input that has been, e.g., automatically generated based on previous user behavior (machine learning), user context (contextual filters), and/or comparison with what similar users do in a similar setting (collaborative filtering). A combination between direct user input and predictive input is also possible. Genetic algorithms could be used to get the predictive inputs to find new types of content for a particular user in a particular context.

The user assistant module 40 then maps the input(s) (e.g. request or interaction) to one or more content "types", content "items" and user "intents", e.g. using some form of rules and/or probability table (step 72). For example a user input such as "Game of Thrones" could be mapped to the content type "video", the particular item "Game of Thrones season 4 episode 5", and an intent of "play in full screen". There may be zero to n user intents (i, j, k) for a given input(s).

This input mapping could use fixed translation maps to translate user and/or predictive inputs to particular content types, content items, and intents, and/or natural language processing, machine learning and/or neural networks could be used to map user inputs and predictive inputs into a probability table of matching content types, content items and intents. A combination of these two methods could also be used.

The input mapping could depend, e.g., on user history, user preferences, the content the user has access to, user context, and other internal and external variables that could affect the user's intent for the input.

The user assistant module 40 then maps the identified content type(s), content item(s), and intent(s) to a dynamic or static user interface layout (display) that will be used when presenting web pages corresponding to the identified content type(s), content item(s), and intent(s) to the user (step 73). This may be based on fixed and/or dynamic rules. These rules can state, e.g., that if a single content type and content item is identified, that will result in a full screen layout for the web page for that particular item, but a situation with multiple content types and/or content items results in a grid layout for the web pages for those items.

In this latter case, for example, where multiple possible content "types" are identified for a given input, one or more categorized grids in an, e.g. tabbed form, could be presented. The categories of various grid tabs could be, for example: Movies, TV-Series, Games, News, E-commerce, Social, Music, Events, Interests, and Custom, with each category in an embodiment monitoring services that are directly relevant, e.g. Netflix and HBO for Movies and TV-series; BBC.com and CNN.com for News; Facebook and Twitter for Social. Some categories could monitor sites with cross-interests, e.g. Facebook+your personal Google calendar+News for events. The categories could be sortable (e.g. in use) using filters such as: Latest, Trending, Trending among friends, Most popular, Free, Surprise me, and Random, with each filter presenting a different sorting of all the information elements within a category.

The system could, e.g., automatically create recommendation lists (as well as, or instead of only one recommendation at a time). Recommendations could be, e.g., generated automatically (algorithmically), and/or come from other users.

The user interface display layouts can be user defined, where the user selects the desired layout manually, and/or selected based on machine learning where the most probable layout is returned. In an embodiment the user interface layout is generated dynamically based on machine learning such as neural networks and genetic algorithms, in an embodiment supervised and trained by the particular user's manual layout corrections.

In an embodiment all of the methods above are used to generate the specific user interface layout(s) for the content type(s), content item(s) and intent(s).

In an embodiment, the results of fetching the web pages are displayed to the user in an overall, "master" layout, but which "master" layout can consist of one to many "sub-layouts", e.g., one for each content source (each source web page). It would also be possible for there to be one or more sub-layouts that display a composition (combination) of content from different web pages, such as a union of information, such as friends lists, that is aggregated from two or more different web pages.

The user assistant module 40 then operates to fetch and interact with web pages corresponding to the content type(s), item(s), and intent(s) determined from the input(s).

To do this, for each determined content type, content item and intent combination (step 74), the user assistant module first determines what sources (e.g. web services) for the content type in question the user has access to (step 75).

Each content type (and item) will be accessible from 0 to n sources that the user has access to. The user assistant module selects the most probable source for the best version of the content type and item available to the user by testing each possible source for the content type and item, until the item is found or there are no more known sources left to investigate (step 76).

At this point a web page or pages relevant to the desired content type and content item will have been identified and so is then fetched.

Next, the instructions to be followed for interacting with the fetched web page(s) are determined.

First a set of general instructions for content items of the content type in question are identified (step 77).

In the present embodiment, for each content type that a web page can belong to, a set of general states, such as a state where a web page is loading, a state where a movie is loading, a state where a video is paused, and a state where a video is playing, is defined. For each defined state, there is a set of general instructions for interacting with a web page in that state, such as how to identify and interact with a play button in a video player from a bitmap image, how to programmatically extract video information from a HTML video element, or how to identify a list of users and to extract the users' profile pictures and read the users' name(s) with OCR.

Other arrangements would, of course, be possible.

Where available, the general interaction instructions are then expanded with more specific instructions for the particular content type and/or web page source in question (step 78). For example, for specific content types and specific sources there might be specific states such as error messages specific to that content provider (source), specific views that are unique for that source, or states that differ slightly from those described in the general instructions, etc. For each of these specific states there might be specific instructions such as how to identify and interact with a particular button in a particular version of a particular video player, how to interact with a particular log-in form, or how to comment/react on a particular type of content item on a particular social network, etc. Specific instructions can be provided for this, if desired.

Once the set of instructions to use for interacting with a fetched web page has been determined, the user assistant module 40 interacts with the web page in accordance with the instructions to try to place the web page in a desired "goal" state (that will be indicated in the instructions) (step 79). This is done for each web page that has been fetched.

The first stage of this process is for the analysis module of the user assistant module to classify the web page retrieved from the item source as being in a given state, such as: document loaded, sign-in needed, player ready, video playing, or video paused, etc. (step 80).

This analysis is done, e.g., by parsing the DOM (Document Object Model) for the web page to detect the presence and visibility of particular DOM items and then determining the state based on the presence and visibility of (or lack of) one or more DOM items. The bitmap for the web page may also be processed (analysed) with computer vision to detect and classify particular objects in the supplied bitmap, with a presence (or lack of) of one or more objects being used to determine the state of the web page. Additionally or alternatively, Javascript may be injected in the web page and used to test for the presence of particular Javascript and/or HTML elements (functions and/or objects), and their attributes, in order to determine their current state, with the presence and/or state of one or more of these elements being used to determine the particular state of the web page.

All these methods may be used in combination to determine the state of the web page. For example, a neural network or machine learning based classifier may be fed with data extracted using one or more of these methods and used to detect and classify the state of a web page.

Once the current state of the web page has been determined, a set or sets of instructions for interacting with the web page in that state is determined and followed by the user assistant module 40 to interact with the web page using the interaction module (step 81).

To facilitate this, in the present embodiment, identifiable web page states have associated with them one or more instructions for converting the web page state into another state. These instructions could be to perform relatively simple interactions, such as navigating the web page to a new url, or for more complex interactions such as using computer vision with object detection and object classification to identify particular regions of interest and using Javascript injection and/or user input emulation to interact with those regions. For example, an instruction set could be for locating the play button in a movie with DOM traversal and then using injected Javascript to emulate a click on that button.

In the present embodiment an alternative instruction set can be used if the first instruction set does not achieve the desired new web page state. For example, in the above example an alternative instruction set could use computer vision object detection and classification on the web page bitmap to extract the location of the play icon on the video player's player controls bar, and a user input actuator emulator to then move the mouse to the location of the play button and to emulate a left mouse click to actuate the play button.

Once a set of instructions to change the state of a web page has been executed, the state of the web page is checked using the same technique(s) as discussed above (step 82), to determine if the state has changed after the instruction set in question has been executed for the web page (step 83).

If the state has not changed, the next alternative instruction set for the current web page state (if any) is tried (step 87).

If the web page state has changed, it is then determined if the new state of the web page matches the desired result state for the instruction set that was executed (step 84).

If the new state does not match the desired result state, machine learning is used to reduce the probability of selecting this particular instruction set when trying to reach this particular desired state from the particular current state of the web page in the particular current context of the operation in future (step 85). The context in this regard may be described by parameters such as, but not limited to, the user's geographical location, the user's operating system, and the user's language preferences.

If the interaction caused by the instruction set does not result in reaching the desired result state, then the state of the web page is reverted to the previous state (step 86), and the next alternative interaction instruction set (if any) is tried (step 87).

On the other hand, if the new web page state following the interaction matches the desired result state, machine learning is used to increase the probability of selecting that particular instruction set when trying to reach that particular desired state from the particular current state of the web page in the particular current context of the operation (step 88).

If following the interaction with the web page, the web page has moved to the desired result state for that set of instructions, it is then determined whether the new state of the web page matches a defined, end "goal" state for this particular content item (step 89).

If following the interaction with the web page, the new state of the web page does not match the desired end "goal" state, then the process returns to execute further sets of instructions for interacting with the web page to further change its state until the goal state is reached (or it is determined that the goal state cannot be reached) (step 90).

In the case where, for whatever reason, the desired "goal" state is unable to be reached for a given web page, then in an embodiment some form of default operation is performed, such as prompting the user to make a direct input to achieve their desired intent.

In general, in the present embodiment, if the attempted interaction with a web page is unsuccessful, then in an embodiment one or more of the following operations are performed (possible): (as discussed above) reverting to the previous state of the web page and trying a different set of instructions to interact with the web page; loading an alternative source for the content type, item and/or intent that has been identified; showing the "unprocessed" source web page to the user and letting the user complete the process (with the system ideally learning what the user does so as to improve its operation in the corresponding situation in the future); showing some form of error message to the user, e.g. indicating that the desired content type, content type and/or intent cannot be met; and generating a support request (e.g. to cause an operator to attempt to solve the problem for the future or to trigger immediate assistance from an operator), etc.

On the other hand, if following the interaction with the web page, the new state of the web page does match the desired end "goal" state, then the interaction operation is determined to be completed, such that no more sets of instructions need to be tried for the web page in question (step 91).

The process then proceeds to the next stage for the web page in question, which is to configure the analysed and interacted with web page (or at least some or all of its content) for display to the user.

To do this, the source web page for the content item i in question is transformed into a desired display layout l (step 92). In the present embodiment this is done by injecting CSS (Cascading Style Sheets) into the web page to transform the layout of the content in the web page. This could additionally or alternatively be done by extracting an image from the bit map of the web page using computer vision techniques such as object detection and object classification, and/or by exporting data from the source web page in a format such as JSON (JavaScript Object Notation) and using that to populate the new display layout with the data.

As well as displaying the desired web page content in the desired layout, in order to make it possible for the user to be able to interact with the content from the source web page, the user assistant module also maps appropriate interaction elements from the fetched web page(s) to corresponding interaction elements that will be displayed in the user interface layout for the web page that is displayed to the user (step 93). A communication channel for programmatic communication with the source web page is also created.

In the present embodiment this is done by injecting Javascript into the web page that can communicate with the user interface display layout for the web page and run code snippets to perform interactions with the web page on behalf of the user. In an embodiment, user interaction in the displayed user interface layout for the web page is mapped to a user input emulator that can emulate user inputs such as, but not limited to, keyboard and mouse inputs, in the source web page. In an embodiment interaction with the displayed user interface layout for the web page is mapped 1:1 to the source web page in such a way that a user can directly interact with the source web page via the displayed user interface layout.

This is all repeated for each source web page for a given content type, item and intent (step 94), and for each content type, item and source combination (step 95).

Once all the desired source web pages have been processed in the above manner, each fetched web page will have been transformed into the desired user interface layout for that web page.

The process now proceeds to combine the so-processed source web pages (i, j, k) in their transformed user interface layouts (l, m, n) into the selected overall "master" user interface layout (determined as discussed above) for displaying the (content of the) fetched web pages to the user.

To do this, the processed source web pages (i,j,k) in their transformed layouts (l,m,n) are provided to the composition module 64 for insertion into the master user interface layout (step 96).

The composition module 64 then inserts the source web pages (i,j,k) in their transformed layouts (l,m,n) into into the master user interface layout (step 97).

The composition module 64 also inserts one or more "custom" interaction objects, such as player controls for a video, in the master user interface layout (step 98) and maps the inserted custom interaction object(s) to the corresponding function in the source web page(s), such that interaction by a user with the custom interaction object in the user interface display will trigger the corresponding mapped function in a source web page (step 99).

For example, a play button in the custom interaction object "player controls" in the displayed user interface could be mapped to an injected Javascript function in a source web page that calls the play method on an HTML video object. Similarly, the "pause" button in the custom interaction object player controls could be mapped to a computer vision detect and classify method that locates the pause button on the player in a source web page and that triggers an emulated user input mouse action where the mouse is moved to the location of the pause button in the source web page and the left mouse button pressed.

Once the source web pages are inserted into the user interface layout, the custom interaction objects have been inserted, and the interaction and communication mapping is ready, the complete master user interface layout is displayed to the user (step 100).

The process then waits for a new input that will trigger the process again.

FIG. 7 shows the general operation in an embodiment of the technology described herein.

As an example of the operation that could be performed using the embodiment illustrated in FIG. 7, a user might for instance want to watch a movie that has been presented in an aggregated entertainment offering. The user would select, click, touch, type or give some other user input indication of this "intent".

The user-assistant module 40 would then identify which web source can offer the movie and load this source. If the user is not already logged in to the service, the user assistant module would fetch the user credentials from storage, either local or online, or alternatively ask the user for the log-in credentials. These operations as presented by the web service in question would be hidden from the user.

When the source is loaded with the appropriate movie from the appropriate service the user assistant module would then identify where the play symbol is and activate it (this is, again, invisible for the user).

Furthermore, the user assistant module may identify the "full screen" button and launch the service player in full screen. The user assistant module might also present a player control which is different from the service in question's specific player control.

At this stage the full screen movie the user selected is presented to the user for consumption.

The user assistant module could then continuously scan the player controls (invisible for the user) to read "time elapsed" and transform this into the user assistant module's own player control. If the user decides to pause the movie, the user assistant module will translate the "pause intent" by identifying where the service in question's pause button is.

In parallel with this process, the user assistant module could also scan other services the user has access to, e.g. the user's facebook page. If any changes are detected to the Facebook page, e.g. that a new friend has gone online and posted a movie, the user assistant module could navigate to this movie, extract the link from it and present this information to the user (now watching a movie) as a notification.

If the user interacts with this notification, the user assistant module could automatically pause the current movie using the same techniques described above and initiate the same procedure as when the user started the original movie, but this time for the Facebook movie.

After the user has posted this Facebook movie, he/she could choose to interact with the movie through a user assistant module specific "like" button. This "like" would then go through the same procedure on the Facebook web page, identifying where the like is and on behalf of the user press the like button. The user could then return to the movie that was paused by the notification interruption.

Figure 8:
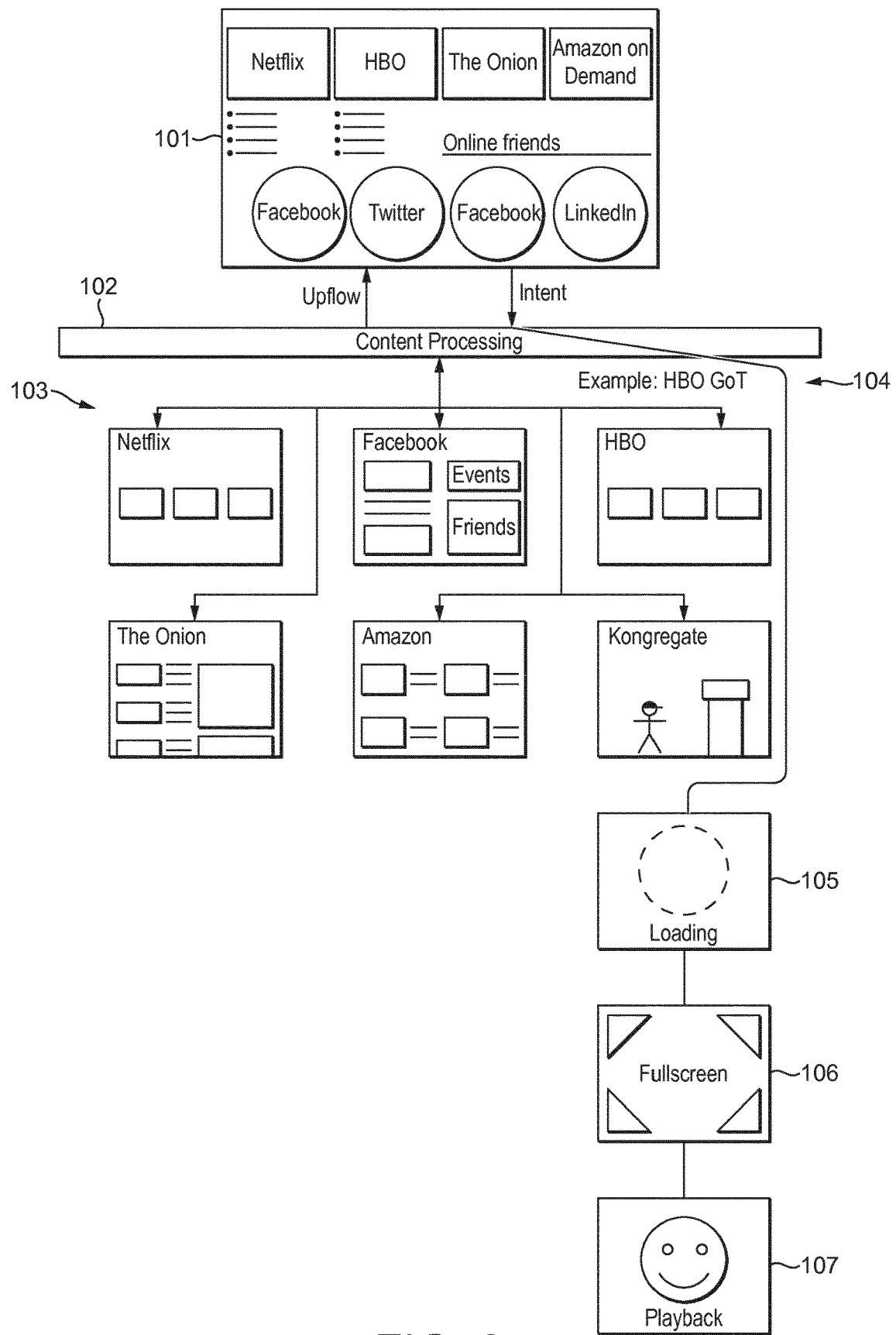
FIG. 8 shows schematically an embodiment of the technology described herein.

FIG. 8 shows schematically a particular example of the above type of operation in an embodiment of the technology described herein.

As shown in FIG. 8, web pages are gathered by the user assistant module 40 from a number of sources 103, and the content of these web pages is processed and transformed by the user assistant module 40 and gathered into one user interface display (and service) to present the user interface 101 that the user sees.

The web page sources could be anything currently available on the Internet or any other networks, either freely available or behind a paymentwall, and can include services such as video streaming services, social networks, online games, news and other kinds of entertainment.

In this example, it is assumed that the end user wants to see the HBO TV series Game of Thrones 104. This starts with a user interaction from within the presented user interface 101, which is then translated to the correct intent by the user assistant module 40, which accordingly then starts the HBO service.

Because the service might take some time to start up, the user assistant module 40 starts by showing the user a loading screen 105, so that feedback is given that an operation is running in the background.

When the desired content has been loaded, the user assistant module 40 determines whether the user would want to run the content filling the whole screen (full screen), and if so, interacts with the web page to enlarge the video stream so that it fills the full screen area 106.

Following the content being loaded, and the playback has being adjusted, the user assistant module 40 then starts the playback 107.

Other examples of operations that the present embodiments would facilitate and could be used for include interactions with social networks, such as: finding friends (e.g. where the user has provided logins for several social networks, the system could scan through these services to find a user's "Friends"); determining and indicating a user's friends' status (e.g. by scanning through connected social networks for the current status of connected users); chatting with friends, coordinating consumption of the same content at the same time with friends; identifying recommendations for a user or a group of users, e.g. based on other users' preferences and/or recommendations; sharing information such as pictures, links, documents, etc.

For each such operation there would be a set of instructions for emulating how an end user would interact with the application in question, that control and trigger interactions that are executed on the web pages themselves (not through an exposed API), including both retrieval of information, and interaction with the web pages (with the services that the web pages represent).

It can be seen from the above that the technology described herein, in its embodiments at least, provides an apparatus that is able to interact with web services on behalf of, and in the manner of, a user interacting with a web service via a web browser, and, furthermore, that can adapt to and understand and learn underlying web sources of information to emulate a user's interaction with information resources available on the Internet.

This is achieved, in the embodiments of the technology described herein at least, by analysing received web pages to identify elements of interest within those web pages, and then interacting automatically with those identified elements to trigger further operations via the web pages.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of interacting with a web page on the internet, the method comprising:
    receiving via a user interface an input or inputs indicative of content accessible via the Internet that a user may wish to access; and
    in response to the input or inputs, automatically:
    using the input or inputs to identify one or more web pages for retrieval based on the input or inputs;
    retrieving the identified one or more web pages;
    analysing by an analysis processing circuit a web page of the one or more web pages to identify an element or elements of interest in the web page; and
    performing by an interaction processing circuit one or more operations in response to and based on the identification of the element or elements of interest in the web page, such that the one or more operations are performed automatically in response to the input or inputs, wherein the one or more operations comprise:
        (i) classifying the web page as being in a particular state based on the identified element or elements of interest in the web page, and then performing one or more operations in response to and based on the determined state of the web page so as to move the web page into a different state; and
        (ii) displaying in the user interface content corresponding to the identified element or elements of interest in the web page, wherein the content comprises a set of one or more interactive elements that can be activated by the user via the user interface, and wherein one or more interactive elements in the set of one or more interactive elements are mapped to at least one corresponding interactive element in the web page, such that activation of the one or more interactive elements in the user interface by the user will cause the activation of the at least one corresponding interactive element in the web page.

2. The method of claim 1, wherein:
    the elements of interest in the web page are identified using one or more of:
    a visual analysis of the bit map representation of the rendered web page;
    an analysis of software code that is associated with the web page; and
    analysis of data that is derived for the web page.

3. The method of claim 1, comprising:
    performing the analysis of the web page to identify elements of interest within the web page in an iterative manner, by first identifying a potential element of interest within the web page, and then performing some form of testing on that identified element to further determine its identity.

4. The method of claim 1, wherein:
    the one or more operations that are performed in response to the identification of the element or elements of interest in a web page comprise performing an action via the web page by interacting with the identified element or elements of interest in the web page.

5. The method of claim 1, wherein:
    the one or more operations that are performed in response to the identification of the element or elements of interest in the web page comprise extracting information corresponding to the identified element or elements of interest in the web page and presenting the extracted information in the user interface to the user.

6. The method of claim 1, wherein:
    the one or more operations that are performed in response to the identification of the element or elements of interest in the web page comprise:
    interacting with the web page via the identified element or elements of interest so as to extract data via the web page; and
    presenting the extracted data to the user in a new and aggregated form.

7. An apparatus for interacting with a web page on the Internet, the apparatus comprising:
    an input processing circuit configured to use an input or inputs indicative of content accessible via the Internet that a user may wish to access to identify one or more web pages for retrieval based on the input or inputs;
    an analysis circuit configured to analyse a web page of the one or more web pages to identify an element or elements of interest in the web page; and
    an interaction circuit configured to perform one or more operations in response to and based on the identification of the element or elements of interest in the web page;
    wherein the apparatus is configured for the interaction circuit to perform the one or more operations automatically in response to the input or inputs being received via a user interface;
    and wherein:
    (i) the analysis circuit is configured to classify the web page as being in a particular state based on the identified element or elements of interest in the web page, and the one or more operations comprise one or more operations performed in response to and based on the determined state of the web page so as to move the web page into a different state; and
    (ii) the apparatus further comprises a composition circuit, and the one or more operations comprise triggering the composition circuit to display in the user interface content corresponding to the identified element or elements of interest in the web page, wherein the content comprises a set of one or more interactive elements that can be activated by the user via the user interface, and wherein one or more interactive elements in the set of one or more interactive elements are mapped to at least one corresponding interactive element in the web page, such that activation by the user of the one or more interactive elements in the user interface will cause the activation of the at least one corresponding interactive element in the web page.

8. The apparatus of claim 7, wherein:
    the element or elements of interest in the web page are identified using one or more of:
    a visual analysis of the bit map representation of the rendered web page;

an analysis of software code that is associated with the web page; and analysis of data that is derived for the web page.

9. The apparatus of claim 7, wherein:

the analysis circuit is configured to analyse a web page to identify elements of interest within the web page in an iterative manner, by first identifying a potential element of interest within the web page, and then performing some form of testing on that identified element to further determine its identity.

10. The apparatus of claim 7, wherein:

the interaction circuit is configured to interact with the identified element or elements of interest in the web page to perform an action via the web page in response to the identification of the element or elements of interest in the web page.

11. The apparatus of claim 7, wherein:

the interaction circuit is operable to extract information corresponding to the identified element or elements of interest in the web page and present the extracted information in the user interface to the user in response to the identification of the element or elements of interest in the web page.

12. The apparatus of claim 7, wherein:

the interaction circuit is configured to, in response to the identification of the element or elements of interest in the web page:

interact with the web page via an identified element or elements of interest so as to extract data via the web page; and present the extracted data to the user in a new and aggregated form.

13. The apparatus of claim 7, further comprising:

a machine learning circuit configured to learn from analysis of and interactions with web pages so to improve the performance of those operations by the apparatus.

14. A data processing system comprising:

a main memory;

a display;

a central processing unit; and input processing software code executing on the central processing unit, configured to use an input or inputs indicative of content accessible via the Internet that a user may wish to access to identify one or more web pages for retrieval based on the input or inputs;

browser software code executing on the central processing unit, configured to retrieve the one or more web pages from the Internet;

analysis software code executing on the central processing unit configured to analyse a retrieved web page of the one or more web pages to identify an element or elements of interest in the web page; and interaction software code executing on the central processing unit configured to perform one or more operations in response to and based on the identification of an element or elements of interest in the web page;

wherein the data processing system is configured for the interaction software code to perform the one or more operations automatically in response to the input or inputs being received via a user interface;

and wherein:

(i) the analysis software code is configured to classify the web page as being in a particular state based on the identified element or elements of interest in the web page, and the one or more operations comprise one or more operations performed in response to and based on the determined state of the web page so as to move the web page into a different state; and (ii) the system further comprises composition software code, and the one or more operations comprise triggering the composition software code to cause content to be displayed in the user interface corresponding to the identified element or elements of interest in the web page, wherein the content comprises a set of one or more interactive elements that can be activated by the user via the user interface, and wherein one or more interactive elements in the set of one or more interactive elements are mapped to at least one corresponding interactive element in the web page, such that activation by the user of the one or more interactive elements in the user interface will cause the activation of the at least one corresponding interactive element in the web page.

15. A non-transitory computer readable storage medium comprising computer software code which when executing on a processor performs a method of interacting with a web page on the internet, the method comprising:

receiving via a user interface an input or inputs indicative of content accessible via the Internet that a user may wish to access; and in response to the input or inputs, automatically:

using the input or inputs to identify one or more web pages for retrieval based on the input or inputs;

retrieving the identified one or more web pages;

analysing a web page of the one or more web pages to identify an element or elements of interest in the web page; and performing one or more operations in response to and based on the identification of the element or elements of interest in the web page, such that the one or more operations are performed automatically in response to the input or inputs, wherein the one or more operations comprise:

(i) classifying the web page as being in a particular state based on the identified element or elements of interest in the web page, and then performing one or more operations in response to and based on the determined state of the web page so as to move the web page into a different state; and (ii) displaying in the user interface content corresponding to the identified element or elements of interest in the web page, wherein the content comprises a set of one or more interactive elements that can be activated by the user via the user interface, and wherein one or more interactive elements in the set of one or more interactive elements are mapped to at least one corresponding interactive element in the web page, such that activation of the one or more interactive elements in the user interface by the user will cause the activation of the at least one corresponding interactive element in the web page.

* * * * *